3,324,108
MONOSACCHARIDE AND OLIGOSACCHARIDE
POLYETHERS
Frederik André Moller, Haren, Groningen, Harmannus Kliphuis, Hoogezand, and Jan Rutgert Herman Schoemaker, Haren, Groningen, Netherlands, assignors to W. A. Scholten's Chemische Fabrieken, N.V., Groningen, Netherlands
No Drawing. Filed June 29, 1964, Ser. No. 378,945
Claims priority, application Great Britain, July 5, 1963, 26,691/63
11 Claims. (Cl. 260—209)

This invention relates to polyethers and to methods for preparing polyethers by reacting reducing monosaccharides and reducing oligosaccharides with 1.2 epoxides, to the polyethers obtained thereby and to their application in the manufacturing of polyurethane resins.

The reaction of certain saccharides with alkylene oxides has been described, for example, in U.S. patent specifications 2,552,528, 2,552,529, 2,652,394, 2,902,478 and 2,927,918. According to these patents, alkaline catalysts are used, such as sodium methylate, sodium hydroxide, trimethyl amine, triethyl amine, and tripropyl amine. The use of alkaline catalysts has the disadvantage that, at the reaction temperatures used, when reducing sugars are employed as the starting materials a marked decomposition of the saccharide occurs which especially causes a strong discoloration of the reaction products. The reactions described in the above patent specifications are carried out in pressure vessels. In order to react reducing saccharides with 1.2 epoxides in the presence of alkaline catalysts it has therefore been the usual practice previously to convert the reducing group into a non-reducing group, e.g. by glycosidation or hydrogenation.

British patent specification 584,971 describes a process for the preparation of polyol derivatives, in which polyols, among which carbohydrates, are etherified in the presence of a substantial proportion of water with alkylene oxides. According to this patent instead of alkaline catalysts acid catalysts may be used, such as boric acid, sulphuric acid, phosphoric acid, sodium dihydrogen phosphate and zinc chloride.

When carbohydrates, such as glucose, are used as polyols, boric acid is the preferred catalysts. The resulting glucose derivative is still reducing. According to this patent, too, it is essential that the reaction should be carried out under pressure.

The invention relates to a process for preparing substantially non-reducing polyethers, which comprises reacting 1 mole of a reducing mono- or oligosaccharide in admixture with a liquefying agent as defined herein, with from about 3 to about 20 moles of a 1.2 epoxide, in the presence of a catalytic amount of a boron trihalide or a complex thereof.

We have found that reducing saccharides, both monosaccharides and oligosaccharides, can be directly converted into polyetheres of uniform molecular structure with 1.2 epoxides in the presence of a liquefying agent without a marked discoloration by using a boron halide as the catalyst.

We have found that in this way, if more than about 3 moles of 1.2 epoxide are used per mole of reducing saccharide, substantially non-reducing polyethers are obtained.

It has further surprisingly been found that by using a boron halide catalyst the reaction proceeds smoothly and uniformly at relatively low temperatures and, in contradistinction to reactions in which other acid catalysts are used, also proceeds smoothly and uniformly if the number of moles of 1.2 epoxy compounds added per mole of saccharide is in the range from about 3 moles to about 20 moles. The catalysis by the boron trihalide is so effective that with most of the 1.2 epoxides the reaction proceeds satisfactorily even under atmospheric pressure, so that the use of superatmospheric pressure is not necessary. This has the advantage that less byproducts, originating from polymerization reactions, are formed. Therefore, although the invention is not restricted thereto, the reaction between the reducing saccharide and the 1.2 epoxide in the presence of the boron trihalide catalyst is preferably carried out under atmospheric pressure.

In order to effectuate the reaction of the saccharide with the 1.2 epoxide, it is essential to add in the initial stage of the reaction a liquefying agent, as defined hereinafter. It has been found that the reducing saccharides react very slowly when in solid form with the 1.2 epoxide and may be charred by the addition of the catalyst, but by the addition of a liquefying agent the initial reaction is facilitated. Once the reaction is started, the intermediate products formed become liquid at the reaction temperature and further reaction proceeds at an increased rate. A preferred procedure comprises feeding the 1.2 epoxide gradually to the mixture of reducing saccharide, liquefying agent and boron trihalide catalyst at about the rate at which it reacts, thus permitting an effective temperature control and keeping the formation of undesirable byproducts at a minimum.

Examples of suitable reducing monosaccharides and reducing oligosaccharides are, pentoses and hexoses, such as xylose, glucose, fructose and galactose, disaccharides, such as maltose and lactose, and higher saccharides, such as maltotriose and maltotetraose. Mixtures of these sugars may also be used as starting materials, such as reducing starch hydrolysis products, for instance starch sugar. Derivatives of reducing mono- and oligosaccharides such as acylated or alkylated products may also be employed, provided that the saccharide derivative is still reducing and contains free hydroxyl groups. Examples of such derivatives are alkylated glucoses and fosforylated starch hydrolysis products.

Examples of suitable 1.2 epoxides are ethylene oxide, propylene oxide, butylene oxide, butadiene monoxide, cyclohexene oxide, styrene oxide and epichlorohydrin. Mixtures of 1.2 epoxides can also be used.

Suitable catalysts are boron trifluoride, boron trichloride and boron tribromide. The preferred catalysts are boron trifluoride and its complexes with water, inorganic acids, organic acids, alcohols, phenols and ethers. The amount of catalyst to be used is in the range of from 0.01 to 0.5%, calculated on the saccharide. With such amounts of catalyst the reaction will proceed at temperatures as low as 50° C. However, in connection with the liquefaction characteristics of the saccharides to be used, it may be desirable for the reaction to be conducted at higher temperatures, preferably 80° C. to 100° C. The temperature should preferably not exceed 150° C.

The term "liquefying agent" as used herein is taken to mean substances which aid the liquefaction of the saccharide in the initial stage of the reaction between the saccharide and the 1.2 epoxide. Once the intermediate products of this reaction become liquid, the liquefying agent has served its purpose. The liquefying agents may or may not react with the epoxide or the saccharide, or with both. Suitable liquefying agents to be used in the process of the invention are:

(1) Polyhydric alcohols, such as ethylene glycol, diethylene glycol, triethylene glycol, propylene glycol, dipropylene glycol, glycerol, 1,2,4-butanetriol, 1,2,6-hexanetriol, erythritol and sorbitol.

(2) Ethers and esters of polyhydric alcohols. The ethers and esters may contain beside carbon, hydrogen and oxygen atoms other atoms, e.g. halogen and/or phosphor atoms, such imparting special properties to the saccharide polyethers for certain applications. Suitable examples of ethers and esters are the hydroxyalkyl ethers and the phosphoric acid or phosphorous acid esters of the polyhydric alcohols mentioned under (1).

(3) Water, which is capable of forming polyhydric alcohols "in situ" under the conditions of the reaction.

Preferred liquefying agents are esters of phosphoric acid, such as the trihydroxyalkylesters. These esters are excellent media in which to conduct the reaction and they allow higher reaction velocities. It has been established that, by heating and reacting together a reducing saccharide, a trihydroxyalkylphosphate, a boron trihalide catalyst and a 1.2 epoxide, phosphate containing groups are introduced into the saccharide polyether, which presumably may be contributed to a transesterification reaction between the saccharide and the ester of phosphoric acid.

Preferred amounts of polyhydric alcohols and ethers or esters thereof are in the range of 10 to 20%, based on the weight of the saccharide, but for the achievement of special properties higher amounts may be used. The amount of water should not exceed 15%, based on the weight of the saccharide, since otherwise the amount of undesired byproducts is unduly increased.

In the final stage of the reaction the reaction mass may be subjected to a vacuum treatment to remove any excess of 1.2 epoxide or other volatile contaminants. If necessary, the product may be subjected to a decolourizing treatment, for instance with activated clays, carbons or synthetic resins. The polyethers of this invention are very light coloured syrups of relatively low viscosity. They show no tendency to crystallize on long storage. These products may be used, for example, as humidity controlling agents or as plasticizers. Inasmuch as the products of the invention contain a relatively high percentage of reactive, primary hydroxyl groups and have a uniform molecular structure they may serve with advantage as intermediates for the production of synthetic resins.

Thus they may in particular be used as valuable intermediates in the preparation of porous or nonporous polyurethane resins. Porous resins of excellent properties may be produced by reaction of the polyethers of this invention with an organic polyisocyanate in the presence of a catalyst, such as a tertiary amine and/or a metal compound, and a stabilizer, such as a silicone oil, in the presence of water or a halohydrocarbon to cause the foaming reaction. Nonporous polyurethane resins may be produced by mixing the polyethers of this invention in a first step with an excess of an organic polyisocyanate and then mixing the resulting product in a second step with a cross-linking agent, such as a polyhydric alcohol or a polyamine and casting and curing the resulting mixture in a mould. Inasmuch as the polyethers of this invention are substantially free of reducing groups, the polyurethane formation proceeds without any difficulty and the keeping qualities of the polyurethane resin on storage are not impaired.

The polyurethane resins obtained may be flexible or rigid, depending on the nature of the saccharide polyether. In case rigid foams are produced it is desirable to keep the amount of dihydric alcohols used as liquefying agent in the production of the saccharide polyether at a minimum. The same holds true for the use of water as liquefying agent, since in that case dihydric alcohols are formed "in situ." It is therefore essential that in the production of saccharide polyethers destined for use in the preparation of rigid polyurethane foams the total amount of water, added as such or with the saccharide, should be less than 5%, based on the weight of the reducing mono- or oligosaccharide.

The polyurethane resins have improved fire-retardant properties when phosphorylated mono- or oligosaccharides are used as starting materials and/or halogen or phosphorus containing liquefying agents are used in the preparation of the polyethers.

The invention is illustrated but not limited by the following examples, in which parts are by weight.

*Example 1*

A mixture of 180 parts of glucose monohydrate (0.9 mole) and 6 parts of water is heated at a temperature of 100° C., in a vessel equipped with a reflux condenser and stirrer. Subsequently, 0.25 part of $BF_3$-acetic acid complex (40% $BF_3$) are added. In the course of about 10 hours 609 parts of propylene oxide (10.5 moles) are added gradually to the mixture, the reaction temperature being maintained at 80° C., while from time to time some more catalyst is added, up to 1.25 parts of $BF_3$-acetic acid (40% $BF_3$). The mixture is then allowed to react for two more hours at this temperature, after which the reaction mixture is subjected to a vacuum treatment to remove any volatile components. The final product is a clear colourless, syrupy liquid. The hydroxyl value of the final product is 504 and the reducing value determined by the Luff-Schoorl method and expressed as percent glucose 1.6.

*Example 2*

Employing the same equipment as in Example 1 198 parts of glucose monohydrate (1 mole), are heated to a temperature of 110° C. After addition of 0.25 part borium trifluoride ethyletherate (47% $BF_3$) and employing the same procedure as in Example 1, 1160 parts of propylene oxide (20 moles) and 1.5 parts of borium trifluoride ethyl etherate are added gradually over a period of 16 hours, the reaction temperature being maintained in the range from 100° C. to 85° C. The reaction velocity slows down considerably during the addition of the last moles of propylene oxide. When the addition of the propylene oxide is completed, the reaction mixture is maintained at 85° C. for an additional hour and then subjected to a vacuum for 30 minutes at 105° C. A clear viscous liquid is obtained having a reducing value of 0.13 and a hydroxyl number of 260.

From this example it may be concluded that about 20 moles of propylene oxide per mole of saccharide form the upper limit which may be used. On the other hand it has been established, that the minimum quantity of epoxide to obtain a substantially non-reducing polyether is about 3 moles epoxide per mole of saccharide.

*Example 3*

The same equipment as in Example 1 is charged with 15 parts of glycerol and 0.12 part of $BF_3.2\ H_2O$. The mixture is heated to 100° C. and stirred at this temperature. A mixture of 60 parts of propylene oxide and 60 parts of styrene oxide is added in increments, together with 120 parts of glucose (containing less than 1% moisture), to the mixture while stirring at 100 to 110° C. over a period of 2 hours, additional $BF_3.2\ H_2O$ being added from time to time up to a total of 0.6 part. Then 390 parts of propylene oxide are added gradually over a period of 4 hours, the mixture being kept at 90° C. After completion of this addition the reactants are stirred at 90° C. for an additional hour. Volatiles are removed by a vacuum treatment for 30 minutes at 100° C., leaving a clear viscous liquid having a reducing value of 1.1 and a hydroxyl number of 435.

*Example 4*

252 parts of trihydroxypropyl glucose and 0.8 part of $BF_3.2\ H_2O$ are introduced into a reaction vessel fitted with a stirrer and a reflux condenser. The mixture is heated to 115° C. and stirred at this temperature, while adding in increments over a period of 5 hours 1135 parts of starch sugar, 860 parts of propylene oxide and 6.7 parts of $BF_3.2\ H_2O$. The starch sugar is a spray dried starch hydrolysate consisting of glucose, maltose, maltotriose and maltotetraose; the moisture content is 3.5%. Subsequently 2465 parts of propylene oxide are added in about 6 hours and the reactants treated for an additional hour at 90° C. The mixture is vacuum treated leaving a clear viscous liquid having a reducing value of 0.7 and a hydroxyl number of 421.

Example 5

400 parts of tris (ethylene glycol) phosphate (the reaction product of 1 mole of phosphorus oxychloride and 3 moles of ethylene glycol) are charged in a reaction vessel fitted with stirrer and reflux condenser, together with 300 parts of glucose (moisture content less than 1%) and 3.5% parts of $BF_3.2\ H_2O$. The mixture is heated to 110° C. To this mixture 1094 parts of propylene oxide are added at a temperature of 100° C. to 80° C. in the course of 3 hours. The mixture is vacuum treated for 30 minutes at 100° C. to yield a clear amber viscous liquid having a reducing value of 0.1% and a hydroxyl number of 423. The P-content of the phosphorylated glucose polyether is 3.0%.

Example 6

This example describes the preparation of a rigid polyurethane foam using the polyether of Example 4 as the polyol component. The following foam formulation is used:

| | Parts by weight |
|---|---|
| Polyether polyol (hydroxyl No. 421) | 25.0 |
| Polymethylene polyphenylisocyanate [1] | 25.5 |
| Triethylene diamine [2] | 0.25 |
| Silicon surfactant [3] | 0.25 |
| Trichlorofluormethane [4] | 9.0 |

[1] PAPI, Carwin Co.
[2] Dabco, Houdry Process Division.
[3] Silicon L 520, Union Carbide Co.
[4] Arcton, Imperial Chemical Industries.

Following thorough mixing of these components the foam rises to maximum height in 120 seconds. The foam becomes surface tack-free within 10 seconds of attaining maximum height. The results of physical tests carried out on the foam are:

| | |
|---|---|
| Foam density g./cm.³ | 0.027 |
| Max. compression load parallel to rise kg./cm.² | 1.0 |
| Max. compression load perpendicular to rise kg./cm.² | 1.2 |
| Closed cell content percent | 97 |
| Water absorption after 168 hours mg./cm.² | 34 |
| Moisture vapor permeability parallel to rise g./m.²/hour | 0.28 |
| Moisture vapor permeability perpendicular to rise g./m.²/hour | 0.17 |
| Dimensional stability percent vol. change, 24 hr. at 70° F. | 1 |
| Dimensional stability percent vol. change, 144 hr. at 70° F. | 1 |

Example 7

A rigid polyurethane foam is prepared using the polyether of Example 5 as the polyol source and polymethylene polyphenyl isocyanate (PAPI) as the isocyanate source. The general formulation in the preparation of the phosphorus containing polyurethane foam is similar to that used in Example 6.

A non-shrinking polyurethane foam containing fine pores is obtained. The foam is difficult to ignite; when subjected to a standard flammability test, the foam appears to be self-extinguishing.

We claim:

1. A process for preparing substantially non-reducing polyethers which comprises reacting a reducing saccharide selected from the group consisting of monosaccharides and oligosaccharides with a 1.2 epoxide in the presence of a liquefying agent selected from the group consisting of polyhydric alcohols, ethers of polyhydric alcohols, esters of polyhydric alcohols, and water and in the presence of a catalytic amount of a boron trihalide, the mole ratio of reducing saccharide to 1.2 epoxide present being from about 1:3 to about 1:20.

2. A process as claimed in claim 1, wherein the boron trihalide is added in the form of a complex compound.

3. A process as claimed in claim 1, wherein the catalyst is boron trifluoride.

4. A process as claimed in claim 1, wherein the amount of catalyst is in the range of 0.01 to 0.5 percent, based on the weight of the saccharide.

5. A process as claimed in claim 1, wherein the liquefying agent is water which is present in an amount not exceeding 15%, based on the weight of the saccharide.

6. A process as claimed in claim 1, wherein the liquefying agent is a phosphoric acid ester of a polyhydric alcohol.

7. A process as claimed in claim 1, wherein the reducing saccharide is glucose.

8. A process as claimed in claim 1, wherein the reducing saccharide is a starch hydrolysis product.

9. A process as claimed in claim 1, wherein the 1.2 epoxide is propylene oxide.

10. A process as claimed in claim 1, wherein the process is carried out at a temperature between 50° and 150° C.

11. A process as claimed in claim 1, wherein the process is carried out under atmospheric pressure.

References Cited

UNITED STATES PATENTS

| | | | |
|---|---|---|---|
| 3,167,538 | 1/1965 | Kaiser et al. | 260—210 |
| 3,190,927 | 6/1965 | Patton et al. | 260—209 |

LEWIS GOTTS, *Primary Examiner.*

ELBERT L. ROBERTS, *Examiner.*

JONNIE R. BROWN, *Assistant Examiner.*